April 15, 1969  R. KILLIAS  3,438,574

RADIATOR VALVE

Filed Aug. 22, 1966

INVENTOR
Rudolf Killias
BY
His Attorney 3,438,574
RADIATOR VALVE
Rudolf Killias, Gossau, Switzerland, assignor to
Albert Lins, Kusnacht, Switzerland
Filed Aug. 22, 1966, Ser. No. 574,029
Claims priority, application Switzerland, Aug. 25, 1965,
11,926/65
Int. Cl. F24h 7/02, 9/20
U.S. Cl. 236—42                                    4 Claims

ABSTRACT OF THE DISCLOSURE

A radiator valve is disclosed which comprises a valve housing having a valve seat and a valve disc for regulating the flow of a heating medium cooperating with the valve seat. Temperature sensing means are provided incorporating a housing filled with an expansion medium and a bellows, the housing being detachably and displaceably coupled with the valve housing. A novel control bar means operably connects the bellows with the valve disc, the length of the control bar means being itself adjustable to pre-regulate the passage volume of the heating medium through the valve in a manner independent of the actual thermostatic control of the valve.

---

Figure 1:
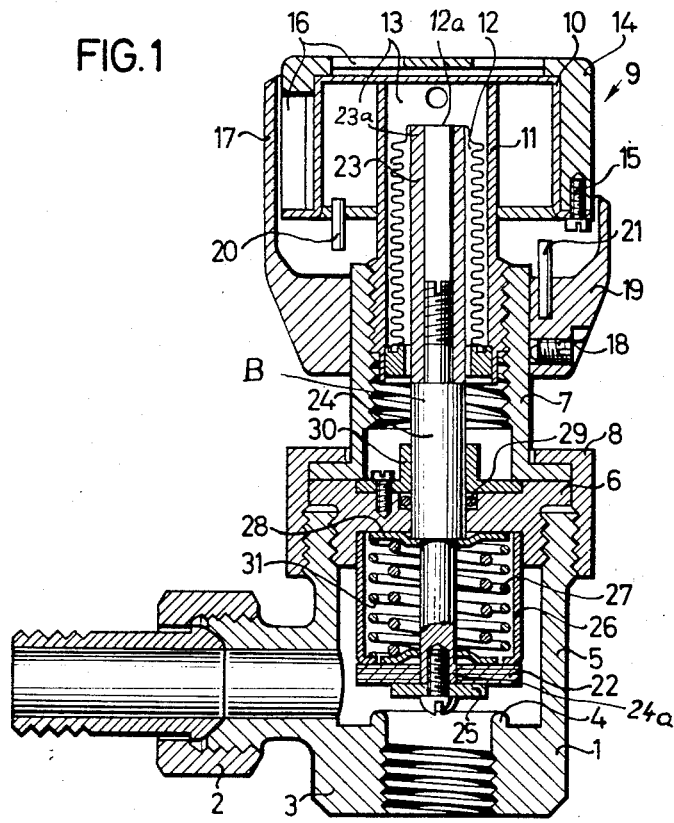

The present invention relates to an improved radiator valve of the type in which a valve disc for regulating the flow of heating medium cooperates with a valve seat and is operatively connected with a bellows, arranged coaxially with respect to the valve seat, of a temperature feeler or sensor means filled with an expansion medium.

In known radiator valves of this general type, the expansion medium influenced by the ambient temperature brings about a change in the length of the bellows, the movement of which in most cases, is transmitted to the valve disc by means of mechanical transmission members. The bellows or the control member fast therewith and acting upon the valve disc, on the one hand, is subjected to the adjustable pressure of a spiral spring, and, on the other hand, is also acted upon by the pressure of the expansion medium. With the known radiator valves, for such expansion medium there is employed a medium which remains in the saturated steam state throughout the entire temperature range. Presetting of the temperature is effected by varying the pressure of the spring, which is controlled by a rotary knob connected to the feeler housing and whose axial displacement caused by rotation is a measure of the preset temperature. Moreover, the temperature feeler is releasably connected with the valve body, in order to enable the mounting thereof only after termination of all installation work, thus protecting the sensitive apparatus.

A drawback, however, with these known radiator valves is manifested by the absence of means for presetting the flow rate of the heating medium through the valve independently of the thermostatic control. Although manually operated valves are known in which presetting is effected by means of a perforated bolt located in the connecting piece and rotatable from outside to bring about a change in the cross section, these measures represent an additional expenditure in the case of thermostatic radiator valves, and moreover, do not provide a compact construction.

Accordingly, it is a primary object of the present invention to provide an improved construction of radiator valve which overcomes the aforementioned disadvantages of prior art valves.

Still a further noteworthy object of the present invention relates to an improved construction of radiator valve which is relatively simple and robust, provides flow rate control independently of thermostatic control, and enables detachment of the temperature feeler means from the valve unit, thereby facilitating interchangeability of the packing means.

Another important object of the present invention is to provide an improved radiator valve of the aforedescribed type which renders it possible to effect throughflow presetting without interfering with the temperature setting and without requiring additional means.

According to the invention the expansion medium acting on the bellows is, in a manner itself known, a liquid with a predetermined expansion coefficient, and the bellows is connected with the valve disc through the agency of a control bar adjustable in length by means of a threaded portion or member seated in axial direction, the length of which control bar is measure for the presetting of the flow rate through the valve.

By using a per se known control liquid instead of a medium remaining in the saturated steam range, the spiral spring previously required for producing the state of equilibrium on the bellows is eliminated. This makes it possible to exploit the axial length variation previously required for prestressing the spiral spring for presetting purposes, which is achieved by the arrangement of the variable length control bar.

According to a preferred embodiment, the control bar may traverse the valve housing axially displaceably and may carry on its inner end the valve disc movable axially against the action of a spring, whereas the threaded portion or member is located outside the valve housing. In this manner, on the one hand there is achieved a very easy adjustability of the control bar for flow rate-presetting when the temperature feeler is removed while, on the other hand, the control bar may move under the influence of a temperature increase even when the valve is closed, which prevents destruction of the bellows by pressure.

Figure 2:
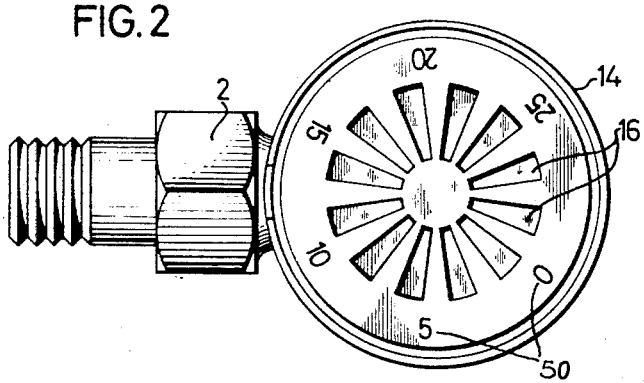

The invention will be better understood, and objects other than those set forth above, will become apparent, when consideration is given to the following detailed description thereof. Such description makes reference to the annexed drawing wherein:

FIGURE 1 shows a cross sectional through a preferred form of inventive radiator valve, in side elevation and FIGURE 2 is a top view of the radiator valve depicted in FIGURE 1.

Describing now the drawing, a valve housing 1 is provided with the connecting pieces 2 and 3 and internally with a closeable valve seat 4. Further, valve housing 1 possesses a sleeve or connecting piece 5 which is coaxially arranged with respect to the valve seat 4. Connecting piece or sleeve 5 is closed by a threaded insert or nut 6. An internally threaded flange element or sleeve 7 is removably seated upon insert 6 and is held against the valve housing 1 by means of a suitable fastening expedient such as cap nuts 8.

A sensor arrangement or temperature feeler unit 9 is partially threaded into the flange element 7 and is axially displaceable by rotation in the control direction. This temperature feeler or sensor unit 9 comprises a hollow box 10 having a threaded neck 11. In the exemplary embodiment, a downwardly open bellows 12 extends within the hollow threaded neck 11. The walls of the temperature box 10 and the threaded neck 11 enclose, together with the envelope surface of the bellows 12, an outwardly hermetically sealed chamber or space 13 filled with a suitable temperature-sensitive liquid of high expansion coefficient.

The box 10 is mounted within a rotary knob 14 and fixedly connected with the latter, for example by means of screw means 15 or the like. The rotary knob 14, which is provided with perforations or apertures 16 to allow easy access to the box 10 by the ambient air, serves to facilitate manipulation during rotation of the temperature feeler assembly 9 for presetting the temperature, as will be described later. To indicate the predeterminable temperature, the rotary knob 14 according to FIGURE 2 has a scale, generally indicated by reference numeral 50, which cooperates with an indicator 17 (FIGURE 1). The temperature indicator 17 is carried by a collar 19 supported upon the flange element or sleeve 7 and secured in position by means of the set screw 18. The confronting faces of the rotary knob 14 and the collar 19 are advantageously provided with impact or stop means in the form of stop pins 20 and 21, which delimit the extent or range of rotation of the rotary knob 14. In this respect, the top region of the collar 19 may carry a nonillustrated perforated plate which makes it possible to bring the pin 21 into various positions in the direction of rotation of the knob 14, or to arrange two pins 21 in the immediate vicinity of the pin 20 to arrest the rotary knob 14.

For transmitting the movement of the bellows 12 to a valve disc 22 cooperating with the valve seat 4, and which valve disc may for example consist of rubber, there is provided a control bar B comprising a threaded sleeve 23 formed of an insulating material and a rotary portion 24. By rotating the threaded sleeve portion 23 relative to the member 24, the length of the control bar B can be adjusted. The rotary portion 24 projecting out of the valve housing at the top, carries at its lower inner end 24a the axially displaceable valve disc or plate 22. The latter is secured against slipping off the rotary portion 24 by an end plate 25.

The upward axial displacement of the control bar B is limited by a sleeve member 26 carried by the insert 6 and against which the valve plate 22 rests, particularly when the temperature feeler is detached from the valve housing. A helical spring 27, supported at one end on the sleeve 26 and at the other end by a collar 28 on the rotary portion 24, supplies the force biasing the control bar B towards the bellows 12, into the latter of which piercingly extends the insulated sleeve portion 23 of the control bar B. Control bar B bears with its front end 23a against the bottom of the bellows 12a.

The hermetic sealing of the valve housing 1 from the temperature feeler unit 9 is ensured for by means of a packing 29 located in the region of the passage of the rotary part 24 of the control bar B through the insert 6. This packing has the form of an O-ring and is secured against falling out by a closure ring 30.

This O-ring packing 29 which is subjected to a certain wear is advantageously easily interchangeable at all times, without having to interrupt the flow of the heating medium. To effect this, first the temperature feeler unit 9 is removed, whereupon the valve disc 22 is pressed under the action of the spring 27 against the sleeve 26 and closes its inner space. Following this, the stop ring 30 can be removed and the O-ring exchanged.

As should be readily apparent, after mounting the valve housing 1, which is carried out without the temperature feeler unit and to which end the position of the temperature feeler unit is expediently occupied by a nonillustrated protective cap on the valve housing, presetting of the rate of flow in the valve zone can be effected This is undertaken by imparting to the control bar B a predetermined position through appropriate rotation of the threaded sleeve 23, and in such a manner that after setting in place the temperature feeler unit 9 the control bar B influenced by the bellows 12 holds the valve disc 22 at a certain distance from the valve seat 4 Following this, only the temperature feeler unit 9 needs to be screwed in place, whereupon control of the valve disc 22 is effected automatically in dependence of the bellows movements As already mentioned, the control bar B is capable of axial movement under the effects of the movement of the bellows even if the valve is closed by corresponding inward rotation of the actuating or rotary knob 14. However, in order to avoid in this case, during an axial movement of the control bar, upwards in the drawing, an entrainment of the valve disc 22, possibly by a tilting of the latter, a further helical spring 31 is provided in the sleeve 6 This helical spring 31 is supported at one end on the collar 28 of the control bar B and at the other end on the valve disc 22

As the foregoing description and the drawings clearly show, the new and improved inventive radiator valve is of an extremely simple and robust construction, which fully satisfies the requirements of, a flow-rate control incorporated into the control system, a compact construction, a removable arrangement of the temperature feeler unit on the valve housing and an easy interchangeability of the packing means It should be apparent from the foregoing detailed description, that the objects set forth at the outset to the specification have been successfully achieved Accordingly, what is claimed is:

1. A valve for a heating apparatus, said valve comprising:
   a valve housing having a valve seat;
   a valve member for regulating the flow of a heating medium cooperating with said valve seat;
   temperature sensor means detachably and displaceably mounted on said valve housing, said temperature sensor means comprising a bellows filled with an expansion medium, said bellows being disposed coaxially with respect to said valve seat in said valve housing;
   a movable control bar means cooperating with said bellows and extending into said valve housing, said valve member being attached to said control bar means, said control bar means including an axial extending threaded sleeve portion disposed in contact with said bellows for adjusting the axial length of said control bar means;
   a sleeve member having shoulder portions defining a second valve seat, said sleeve member being rigidly disposed within said valve housing, said second valve seat being disposed in spaced, coaxial arrangement, with said valve seat in said valve housing, said control bar means extending through said sleeve member; and
   spring means disposed within said sleeve member in said valve housing, said spring means bearing against said shoulder portions of said sleeve member and bearing against said control bar means, said spring means maintaining said threaded sleeve portion of said control bar means in contact with said bellows and, when said temperature sensor means is removed, causes said valve member to abut against said second valve seat.

2. A valve as defined in claim 1, further including sealing means between said valve housing and said control bar means extending thereinto, said sealing means comprising an O-ring, replaceable when said temperature sensor means is removed.

3. A valve as defined in claim 1, wherein said temperature sensor means is removably attached to said valve housing by a flange element and a screw cap adapted to thread on said valve housing.

4. A valve as defined in claim 1, further including a second spring means disposed within said sleeve member in said valve housing, said second spring means bearing against said control bar means and bearing against said valve member.

References Cited

UNITED STATES PATENTS

| | | | |
|---|---|---|---|
| 1,811,418 | 6/1931 | Miller | 236—42 |
| 3,047,055 | 7/1962 | Kimm | 236—92 X |
| 3,228,603 | 1/1966 | Norman | 236—12 |

FOREIGN PATENTS 417,001  10/1962  Switzerland.

ROBERT A. O'LEARY, *Primary Examiner.*

WILLIAM E. WAYNER, *Assistant Examiner.*

U.S. Cl. X.R.

236—100